United States Patent
Agrawal et al.

(10) Patent No.: US 11,983,330 B1
(45) Date of Patent: May 14, 2024

(54) CONTENT CREATION MANAGEMENT DEVICE AND METHOD

(71) Applicant: Motorola Mobility LLC, Chicago, IL (US)

(72) Inventors: Amit Kumar Agrawal, Bangalore (IN); Bill Ryan, Libertyville, IL (US); Jeffrey T. Snow, Barrington, IL (US); Daniel M Vacura, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 18/114,404

(22) Filed: Feb. 27, 2023

(51) Int. Cl.
*G06F 3/01* (2006.01)
*G06F 1/16* (2006.01)
*H04M 1/02* (2006.01)

(52) U.S. Cl.
CPC ............ *G06F 3/017* (2013.01); *G06F 1/1694* (2013.01); *H04M 1/0216* (2013.01); *G06F 2200/1637* (2013.01)

(58) Field of Classification Search
CPC .... G06F 3/0346; G06F 1/1677; G06F 1/1694; G06F 1/017; G06F 2200/1637
See application file for complete search history.

(56) References Cited

U.S. PATENT DOCUMENTS 11,137,894 B1* 10/2021 Chen .................... G06F 3/04855
2021/0096742 A1* 4/2021 Yoon .................... G06F 3/04883

* cited by examiner

*Primary Examiner* — Kevin M Nguyen
(74) *Attorney, Agent, or Firm* — Kunzler Bean & Adamson

(57) ABSTRACT

An electronic device, method, and computer program product for managing a content creation application are disclosed. A first device housing is pivotable relative to a second device housing between a closed position and an axially displaced open position. A first display panel and user interface are exposed when the first device housing and the second device housing are in the axially displaced open position. A second display panel is exposed both when the first device housing and the second device housing are in the closed position and when the first device housing and the second device housing are in the axially displaced open position. The first display panel displays a content creation application, which is mirrored onto the second display panel. A portion of the user interface is overlaid onto the content creation application on second display panel and receives user input to manage the content creation application.

20 Claims, 9 Drawing Sheets

CONTENT CREATION MANAGEMENT DEVICE AND METHOD

FIELD

The subject matter disclosed herein relates to electronic devices, and more particularly to electronic devices having user interfaces operable to manage content creation.

BACKGROUND

Social media content creation has emerged as an extremely popular mechanism for marketing products and services online. For example, Instagram®, TikTok®, Musically®, YouTube® and other social media websites and content creation apps use their digital platforms to build an audience and generate revenue from their content.

Generating content on such platforms, however, requires users to perform several steps in quick succession. First, the content creation application must be opened on a device and a button must be actuated to start the content creation mode. Next, the device must be properly situated and stabilized. The user must then move away from the device such that the device field of view includes the user. Next, the user must produce the content creation and stop recording when the content creation is finished. Then, the user must perform post-processing to remove the redundant contents.

What is needed is an electronic device and method to simplify and streamline the content creation process. Such a device and method are disclosed and claimed herein.

BRIEF SUMMARY

An electronic device for managing a content creation application is disclosed. A method and computer program product also perform the functions of the electronic device. The electronic device includes a first device housing that is pivotable relative to a second device housing between a closed position and an axially displaced open position. A first display panel is coupled to the first device housing. The first display panel is exposed when the first device housing and the second device housing are in the axially displaced open position. In some embodiments, the first display panel includes one or more camera sensors and a user interface configured to receive user input.

In some embodiments, the electronic device includes a second display panel coupled to the first device housing. The second display panel is exposed both when the first device housing and the second device housing are in the closed position and when the first device housing and the second device housing are in the axially displaced open position. The second display panel includes at least a portion of the user interface and has at least one sensor configured to receive user input.

In some embodiments, the electronic device includes a processor and a memory that stores codes executable by the processor. The code is executable to display, on the first display panel, a content creation application and to mirror, on the second display panel, at least a portion of the content creation application. The code is further executable by the processor to overlay onto the content creation application on the second display panel at least a portion of the user interface configured to receive user input. The code is also executable to receive, via the sensor or sensors of the second display panel, the user input to manage the content creation application.

In some embodiments, the code is further executable by the processor to detect, via the at least one camera sensor, a gesture of a user within a field of view and to activate, on the first display panel, the content creation application in response to detecting the gesture. In some embodiments, detecting the gesture of the user includes determining that the user is facing the second display panel. In certain embodiments, the code is further executable by the processor to extract a field of view from the camera sensor. In some embodiments, the code is further executable to display the field of view on the second display panel.

In some embodiments, the code is executable by the processor to detect an orientation of the first device housing. In some embodiments, the orientation includes a stand mode or a tent mode. In certain embodiments, the user input includes touch input and/or gesture input. In some embodiments, the code is further executable by the processor to transfer the user input from the second display panel to the first display panel.

According to another aspect of the invention, in some embodiments, a method for displaying a content creation application may include providing a first device housing that is pivotable relative to a second device housing between a closed position and an axially displaced open position. The first device housing includes a first display panel having a user interface and a second display panel having at least one sensor.

In some embodiments, the method may include displaying, on the first display panel, a content creation application and mirroring, on the second display panel, at least a portion of the content creation application. In some embodiments, the method includes overlaying onto the content creation application on the second display panel at least a portion of the user interface configured to receive user input and receiving, via the at least one sensor, the user input to manage the content creation application.

In some embodiments, the first display panel is exposed when the first device housing and the second device housing are in the axially displaced open position. The second display panel is exposed both when the first device housing and the second device housing are in the closed position and when the first device housing and the second device housing are in the axially displaced open position. In some embodiments, the method may include detecting, via one or more sensors, an orientation of the first device housing. The orientation may include, for example, a stand mode or a tent mode.

In some embodiments, receiving the user input may include detecting, via the at least one sensor, a gesture of the user to activate the content creation application. In some embodiments, receiving the user input includes detecting touch input and/or gesture input. In some embodiments, receiving the user input includes transferring the user input from the second display panel to the first display panel.

A third aspect of the present invention may include a computer program product including a computer readable storage medium that stores code executable by a processor. The executable code may include code to perform displaying, on a first display panel, a content creation application and mirroring, on a second display panel, at least a portion of the content creation application. The second display panel includes at least one sensor. The code may by executable to perform overlaying onto the content creation application on the second display panel at least a portion of the user interface configured to receive user input and receiving, via the at least one sensor, the user input to manage the content creation application.

In some embodiments, the code is further executable to perform detecting an orientation of the first display panel and the second display panel. In some embodiments, the code is further executable to perform detecting, via the one or more sensors, a gesture of a user to activate the content creation application. In certain embodiments, the code is further configured to perform transferring the user input from the second display panel to the first display panel.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be limiting of scope, the embodiments will be described and explained with additional specificity and detail using the accompanying drawings, in which.

DETAILED DESCRIPTION

Figure 1:
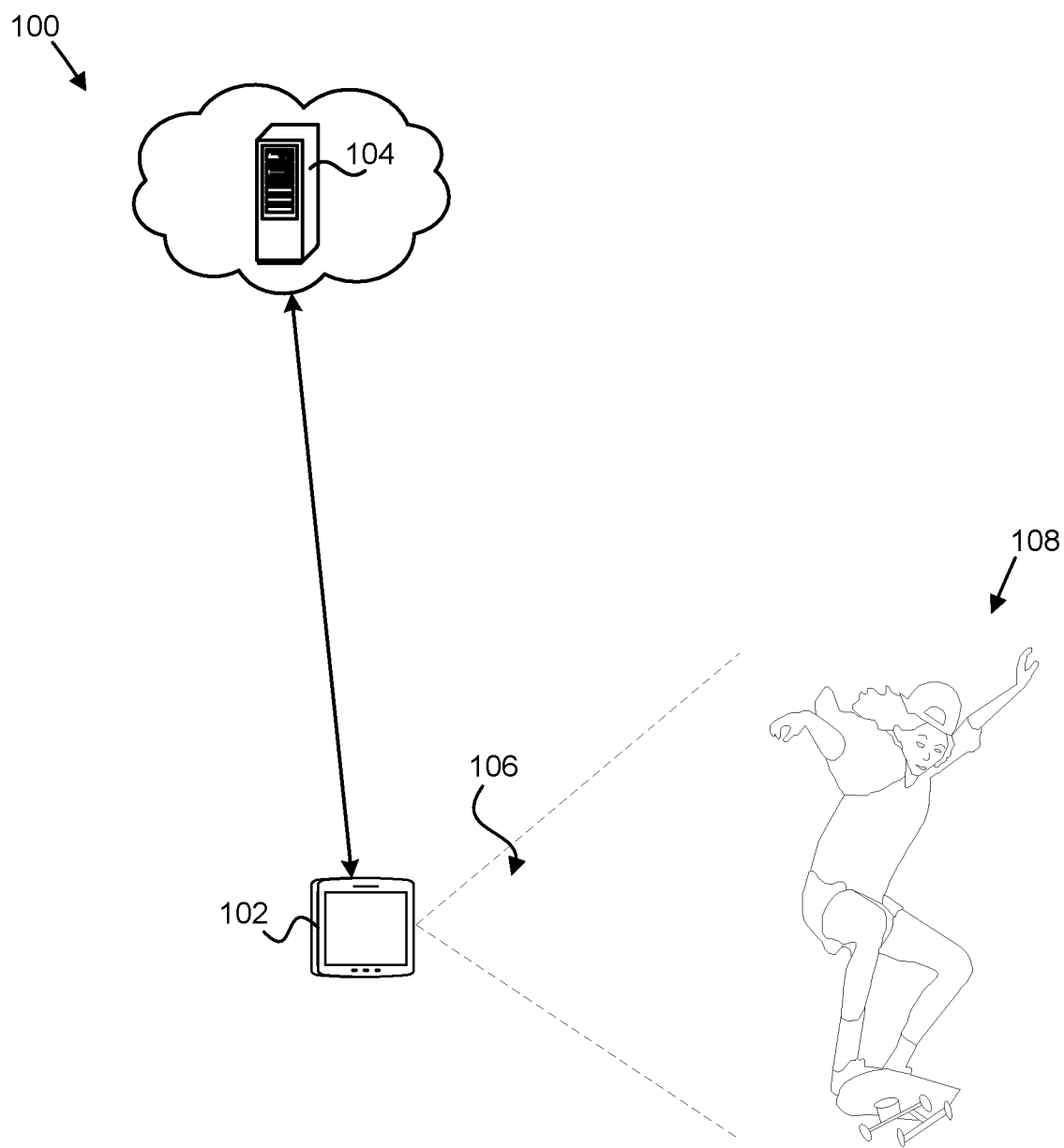
FIG. 1 is a high-level diagram depicting operation of a representative embodiment of an electronic device in accordance with the disclosure.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, to emphasize their implementation independence more particularly. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be written in any combination of one or more programming languages including an object-oriented programming language such as Python, Ruby, R, Java, Java Script, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The embodiments may transmit data between electronic devices. The embodiments may further convert the data from a first format to a second format, including converting the data from a non-standard format to a standard format and/or converting the data from the standard format to a non-standard format. The embodiments may modify, update, and/or process the data. The embodiments may store the received, converted, modified, updated, and/or processed data. The embodiments may provide remote access to the data including the updated data. The embodiments may make the data and/or updated data available in real time. The embodiments may generate and transmit a message based on the data and/or updated data in real time. The embodiments may securely communicate encrypted data. The embodiments may organize data for efficient validation. In addition, the embodiments may validate the data in response to an action and/or a lack of an action.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The electronic devices, methods, systems, program products, and their respective embodiments disclosed herein enable content creation management. The description of elements in each figure may refer to elements of proceeding figures. Like numbers refer to like elements in all figures, including alternate embodiments of like elements. These elements function according to the previous description.

Referring to FIG. 1, social media content creation is a clunky process that requires user to perform multiple steps in quick succession. In addition to actuating the application program on the electronic device, the user must also physically situate both the device and him or herself away from the device, but within its field of view. The user must then begin recording the content, stop recording the content, and perform post-processing on the content. The entire process tends to be imprecise, time-consuming, and frustrating. Devices and methods in accordance with the present invention address these and other issues to streamline content creation management from start to finish.

FIG. 1 illustrates operation of one embodiment of an electronic device 102 in an example environment. As shown, some embodiments of an electronic device 102 may include a smart phone, a personal digital assistant, a personal computer, a notebook (laptop) computer, or any other suitable electronic device. In some embodiments, the electronic device 102 may include one or more substantially rigid materials configured to enclose sensitive internal components, such as those described with reference to FIG. 3 below. For example, in some embodiments, at least a portion of the electronic device 102 may be molded from a thermoplastic polymer such as acrylonitrile butadiene styrene (ABS), polyamide, polycarbonate, polyphenylene ether (PPE), combinations thereof, or the like.

In certain embodiments, as discussed in more detail with reference to FIGS. 2A and 2B below, the electronic device 102 may be geometrically deformable such that it may be easily situated and stabilized to face a user 108 at a distance. For example, in some embodiments, the electronic device 102 may include one or more mechanical elements and/or features such as joints, hinges, springs, pneumatic devices, or other suitable mechanical elements and/or features to enable the electronic device 102 to be self-supporting. In some embodiments, the electronic device 102 may include a tripod, stand, or other stabilization element integrated therewith or coupled thereto. In other embodiments, the electronic device 102 may include a flexible plastic substrate configured to deform and/or retain its shape in response to user manipulation.

Some embodiments of the electronic device 102 may include one or more sensors such as touch sensors, motion sensors, optical sensors, camera sensors, and/or the like, to detect and/or record content within a field of view 106. In some embodiments, the electronic device 102 may automatically sense a subject, such as the user 108, within the field of view 106. Some embodiments may of the electronic device 102 may automatically adjust the field of view 106 to focus on the subject. In some embodiments, sensing the presence of the user 108 may trigger activation of a content creation application or platform such as Instagram, TikTok, Musically, YouTube, or the like. In other embodiments, the electronic device 102 may detect a gesture of the user 108 to trigger activation of the content creation application. For example, in some embodiments, the user 108 may wave a hand or point a finger to trigger activation of the content creation application.

In certain embodiments, the content creation application or platform may be accessed via a remote server, such as a cloud server 104. In some embodiments, the electronic device 102 may communicate with the remote server or cloud server 104 via an appropriate wireless communication technology, such as a Wi-Fi connection, cellular data connection, or the like. In these and other embodiments, the electronic device 102 may communicate with a local server and/or other electronic devices by way of a wired connection and/or wireless transmission methods such as Wi-Fi, infrared, near-field communication ("NFC"), or Bluetooth®.

Figure 2A:
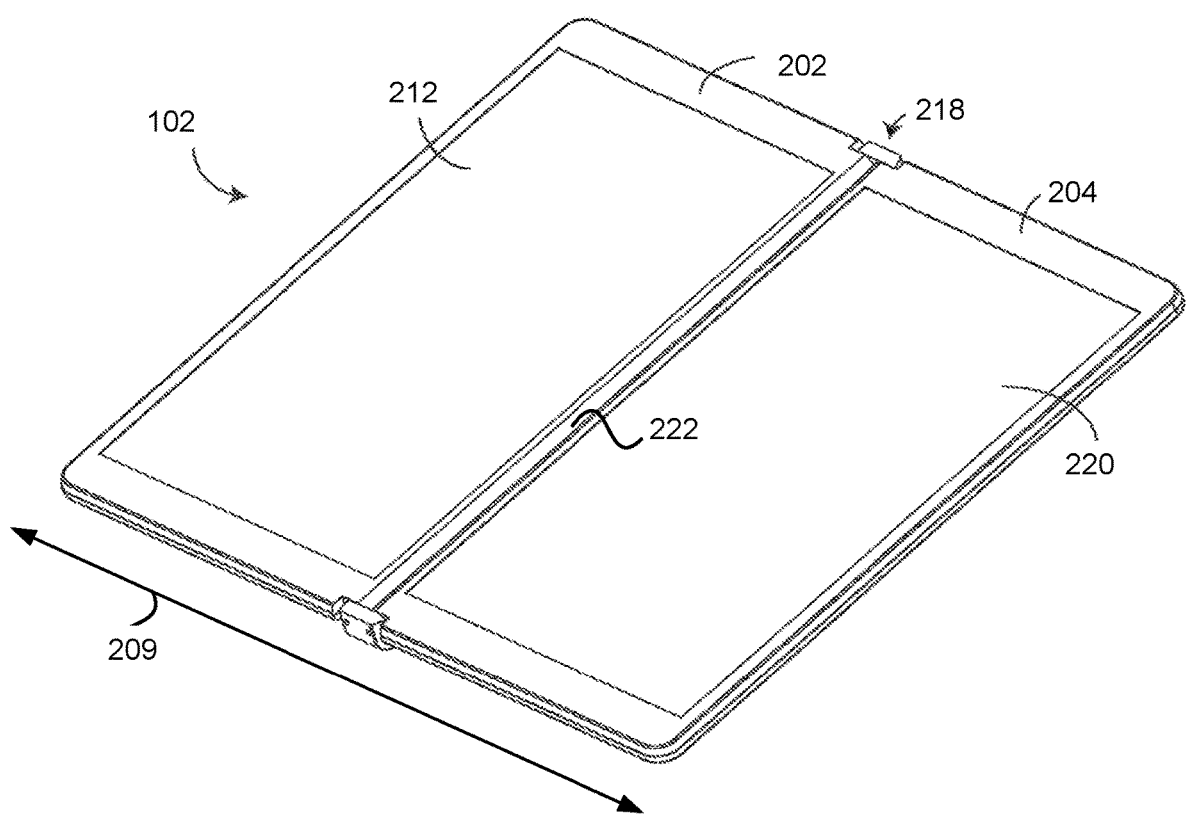
FIG. 2A is a perspective view illustrating a representative embodiment of an electronic device in accordance with the disclosure.
Figure 2B:
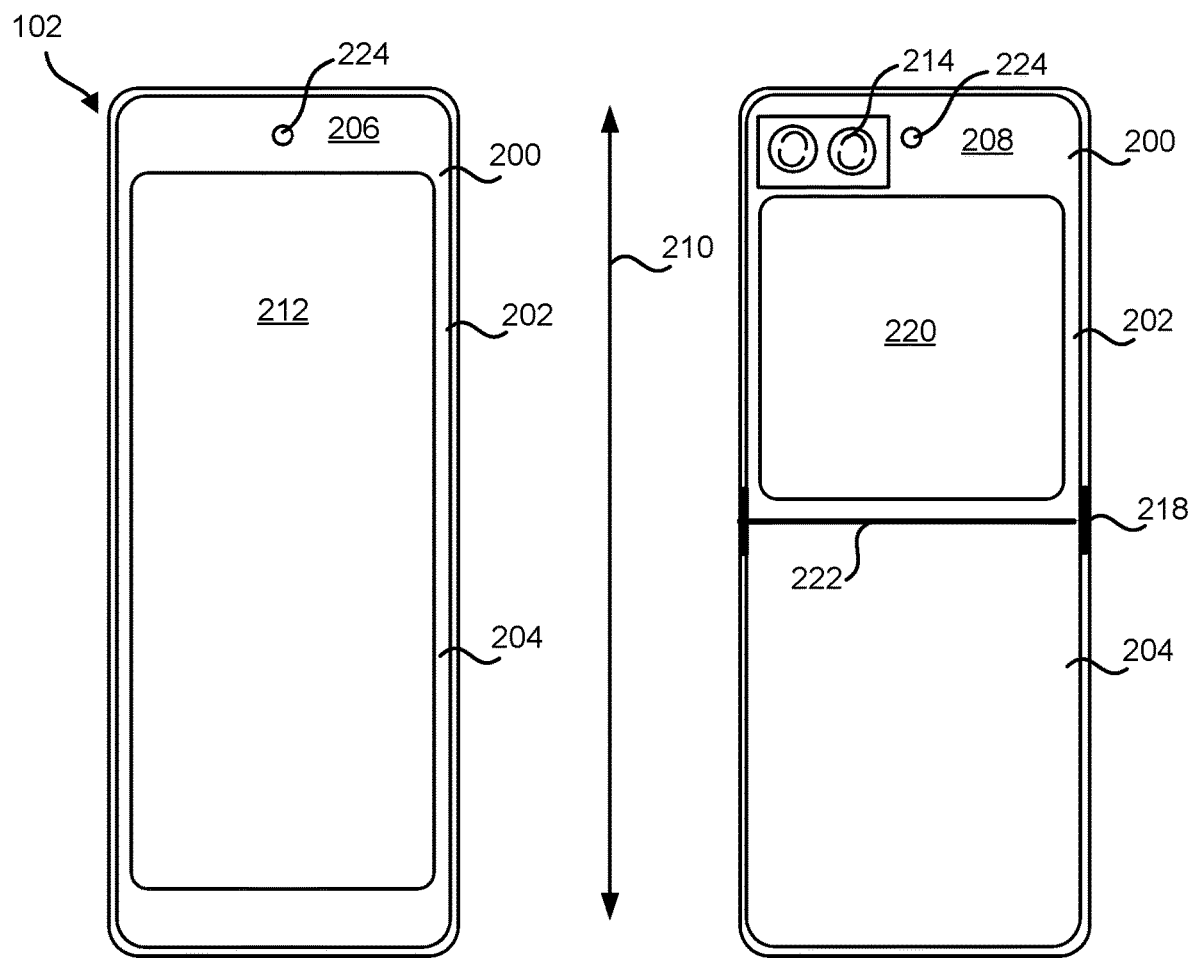
FIG. 2B is a perspective view illustrating another representative embodiment of an electronic device in accordance with the disclosure.

Referring now to FIGS. 2A and 2B, in some embodiments, the electronic device 102 includes a first device housing 202 and a second device housing 204. In some embodiments, the first device housing 202 may be pivotable relative to the second device housing 204 between a closed position and an axially displaced open position.

In some embodiments, the first device housing 202 and the second device housing 204 may include a rectangular or square shape. In these and other embodiments, the first device housing 202 and the second device housing 204 may be substantially identical in size and/or shape. In other embodiments, the first device housing 202 may include a size larger or smaller than the second device housing 204. In certain embodiments, the first device housing 202 may include a regular or irregular shape that differs from the regular or irregular shape of the second device housing 204.

In some embodiments, the first device housing 202 and second device housing 204 may be aligned along a horizontal axis 209 as shown in FIG. 2A. In other embodiments, the first device housing 202 and the second device housing 204 may be aligned along a vertical axis 210 as shown in FIG. 2B. In some embodiments, the first device housing 202 and the second device housing 204 may be aligned along a diagonal or may be aligned or oriented relative to each other in any other suitable arrangement.

In some embodiments, as shown in FIG. 2A, the first device housing 202 and the second device housing 204 may be aligned along the horizontal axis 209 and corresponding adjacent edges 222 of the first device housing 202 and the second device housing 204 may be disposed transverse to the horizontal axis 209. Similarly, in other embodiments, as shown in FIG. 2B, the first device housing 202 and the second device housing 204 may be aligned along the vertical axis 210 and corresponding adjacent edges 222 of the first device housing 202 and the second device housing 204 may be disposed transverse to the vertical axis 210.

In certain embodiments, a hinge 218 or other suitable mechanical device may couple corresponding adjacent edges 222 of the first device housing 202 and the second device housing 204. In some embodiments, the hinge 218 may enable the first device housing 202 to pivot relative to the second device housing 204 at any angle between zero (0) and one hundred eighty (180) degrees. In other embodiments, the hinge 218 may enable the first device housing 202 to pivot relative to the second device housing 204 at any angel between zero (0) and ninety (90) degrees. In some embodiments, the first device housing 202 may be coupled to the second device housing 204 via a two-way hinge 218 such that the first device housing 202 may disposed at any acute, right, or obtuse angle from zero (0) to three hundred sixty degrees (360) relative to the second device housing 204. In some embodiments, the hinge 218 may include a frictional element configured to automatically retain a position of the first device housing 202 relative to the second device housing 204 in the event that the first device housing 202 is axially displaced relative to the second device housing 204.

In other embodiments, the electronic device 102 may include a brace, clip, or other mechanical element to selectively retain a position of the first device housing 202 relative to the second device housing 204. In some embodiments, the first device housing 202 and the second device housing 204 may be monolithically formed as a single unit. In these and other embodiments, the electronic device 102 may include one or more joints, perforations, or other suitable integrated features to permit geometric deformation of the electronic device 102 by bending, flexing, or otherwise deforming the relationship or orientation between the first device housing 202 and the second device housing 204. As described in more detail below with reference to FIGS. 4A and 4B, an advantage of the geometrically deformable relationship between the first device housing 202 and the second device housing 204 is the ability to render the electronic device 102 self-supportable.

In some embodiments, the first device housing 202 may include a first display panel 212 and a second display panel 220. In some embodiments, as shown in FIG. 2A, the first display panel 212 may be coupled to the first device housing 202 and the second display panel 220 may be coupled to the second device housing 204. In some embodiments, the first display panel 212 and the second display panel 220 may be identical or substantially similar in size and shape and may include any rigid or flexible substrate or other suitable material. In other embodiments, the second display panel 220 may be smaller than the first display panel 212. Of course, the first display panel 212 and the second display panel 220 may include any irregular or regular shape as well as any suitable dimensions.

In other embodiments, as shown in FIG. 2B, both the first display panel 212 and the second display panel 220 may be coupled to the first device housing 202. Each of the display panels 212, 220 may be coupled to the first device housing 202 via an adhesive, a press fit, and/or any other suitable element or device. In some embodiments, the first display panel 212 may be coupled to a front surface 206 of the first device housing 202 and the second display panel 220 may be coupled to a back surface 208 of the first device housing 202. In this manner, in some embodiments, the first display panel 212 may be exposed when the first device housing 202 and the second device housing 204 are in the axially displaced open position.

The second display panel 220, on the other hand, may be exposed both when the first device housing 202 and the second device housing 204 are in the closed position and when the first device housing 202 and the second device housing 204 are in the axially displaced open position. Since the second display panel 220 may always be exposed regardless of whether the electronic device 102 is in the axially displaced open position or the closed position, the second display panel 220 may also be referred to as a "quick view display" or "qvd."

In some embodiments, the first display panel 212 and/or the second display panel 220 may display a user interface 216 to enable the user 108 to configure or otherwise control the electronic device 102. In one embodiment, the second display panel 220 includes at least a portion of the user interface 216 of the first display panel 212 and has at least one sensor 224 configured to receive user input.

In some embodiments, the first display panel 212 and/or the second display panel 220 include a touchscreen or other touch-sensitive display configured to display the user interface 216 and receive user input in the form of touch input. In some embodiments, the touchscreen may include a resistive or capacitive touchscreen. Some embodiments may include a liquid crystal display (LCD) touchscreen configured to receive and display touch input from the user 108. In other embodiments, the first display panel 212 and/or second display panel 220 may include an LCD display, an LED display, an OLED display, or any other suitable display.

In certain embodiments, the first display panel 212 and/or second display panel 220 may include one or more sensors 224 configured to detect the user 108 or another subject within a field of view 106 of the electronic device 102. The sensors 224 may include, for example, motion sensors, optical sensors, touch sensors, camera sensors, and/or any other suitable sensors. In some embodiments, one or more of the sensors 224 may be integrated into the first device housing 202 and/or the second device housing 204 and may be configured to communicate with the first display panel 212 and/or second display panel 220. For example, as shown in FIG. 2B, some embodiments of the electronic device 102 integrate one or more camera sensors 214 and/or other sensors 224 into a periphery of the first device housing 202. In this manner, the sensors 214, 224 may not obstruct or otherwise interfere with the real estate of the first display panel 212 and/or second display panel 220.

Figure 3:
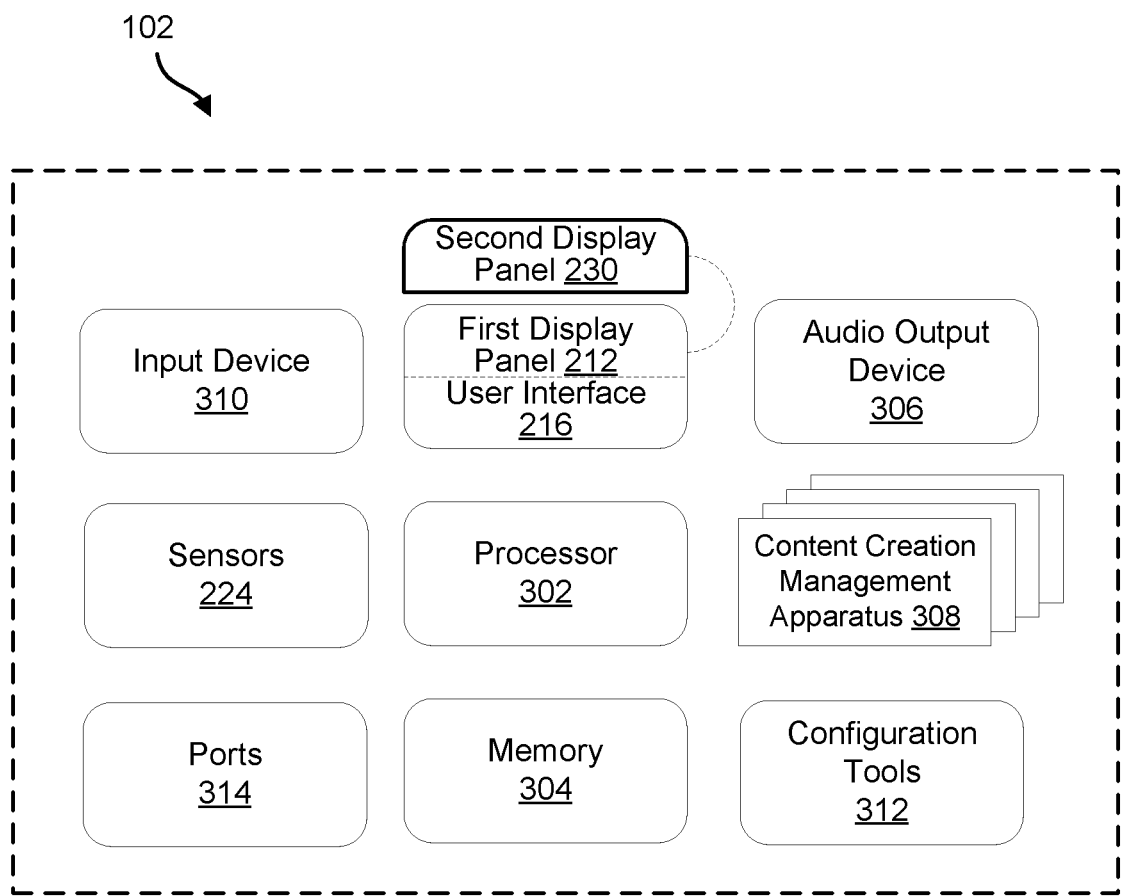
FIG. 3 is a high-level schematic diagram of a representative embodiment of an electronic device in accordance with the disclosure.

Referring now to FIG. 3, some embodiments of the electronic device 102 may include various sensitive internal components configured to manage content creation. In some embodiments, for example, the electronic device 102 may include one or more input devices 310 configured to receive user input. In some embodiments, the input device 310 may include a keyboard, camera, microphone, and/or various sensors 224 and/or modules configured to detect user input from an external environment. In some embodiments, the sensors 224 may include, for example, touch sensors, noise sensors, proximity sensors, heat sensors, ultrasonic sensors, light sensors, camera sensors, motion sensors, location sensors, and the like. In some embodiments, the input device 310 may include various modules such as a facial recognition module and/or gesture module, for example, to detect user input in the form of a facial expression or gesture of the user 108.

In some embodiments, the input device 310 may be combined with all or portions of the first display panel 212 and/or second display panel 220. For example, in some embodiments, the first display panel 212 and/or second display panel 220 may be touch-sensitive such that the first display panel 212 and/or second display panel 220 may be configured to receive user input in the form of touch input from a finger, stylus, or other object.

Some embodiments of the electronic device 102 may further include a processor 302 and a memory 304 storing code executable by the processor 302. The processor 302, in one embodiment, may include any known controller capable of executing computer-readable instructions and/or capable of performing logical operations. For example, the processor 302 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 302 executes instructions or code stored in the memory 304 to perform the methods and routines described herein. The processor 302 is communicatively coupled to the memory 304 storing the content creation management apparatus 308, as well as to the input device 310, the first and second display panels 212, 220, configuration tools 312 including the user interface 216, ports 314, audio output devices 306 such as speakers or headphones, and/or various sensors 224.

The memory 304, in one embodiment, is a computer readable storage medium. In some embodiments, the memory 304 includes volatile computer storage media. For example, the memory 304 may include a RAM, including dynamic RAM ("DRAM"), synchronous dynamic RAM ("SDRAM"), and/or static RAM ("SRAM"). In some embodiments, the memory 304 includes non-volatile computer storage media. For example, the memory 304 may include NAND flash memory, NOR flash memory, nano random access memory (nano RAM or "NRAM"), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like. In some embodiments, the memory 304 includes both volatile and non-volatile computer storage media.

In some embodiments, the memory 304 stores data and/or metadata relating to content creation management. In some embodiments, the memory 304 also stores program code of the content creation management apparatus 308 and related data, such as an operating system or other middleware or algorithms operating on the electronic device 102.

In some embodiments, for example, the code may be executable to display, on the first display panel 212, a content creation application and to mirror, on the second display panel 220, at least a portion of the content creation application. In some embodiments, the content creation application may include, for example, Instagram®, TikTok®, Musically®, YouTube®, or any other social media content creation application accessible via the internet or locally stored.

In some embodiments, the content creation application may query the user for content, receive and/or modify the content, and publish and/or store the content. In certain embodiments, the content creation application may be configured to store the content locally in memory 304 or on an external storage device in communication with the processor 302. In other embodiments, the electronic device 102 may include one or more wireless communication ports 314 such as a Wi-Fi port, a Bluetooth port, an NFC port, an IR port, or the like, to facilitate accessing and/or storing content on a remote server or cloud server 104, for example, and publishing content on the internet.

Figure 4A:
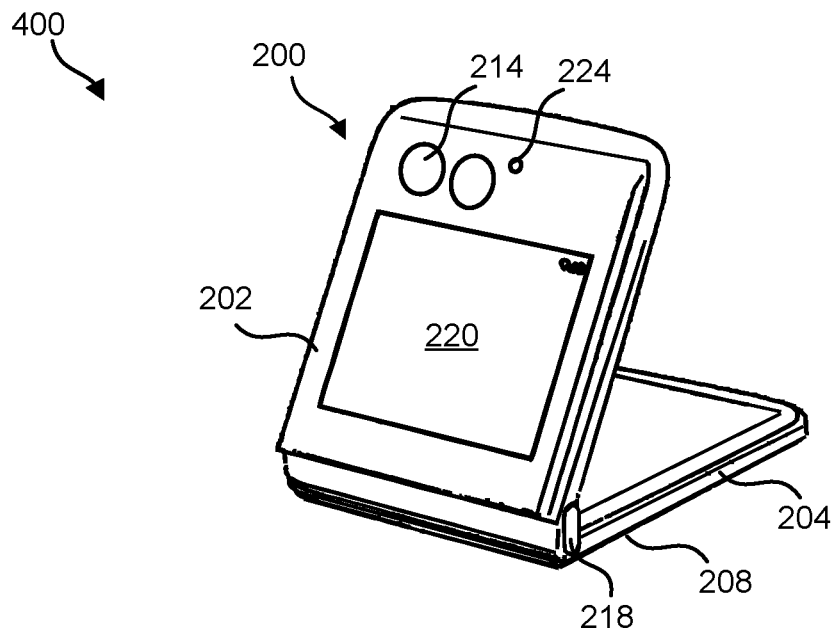
FIG. 4A is a perspective view of one embodiment of an electronic device in stand mode in accordance with the disclosure.
Figure 4B:
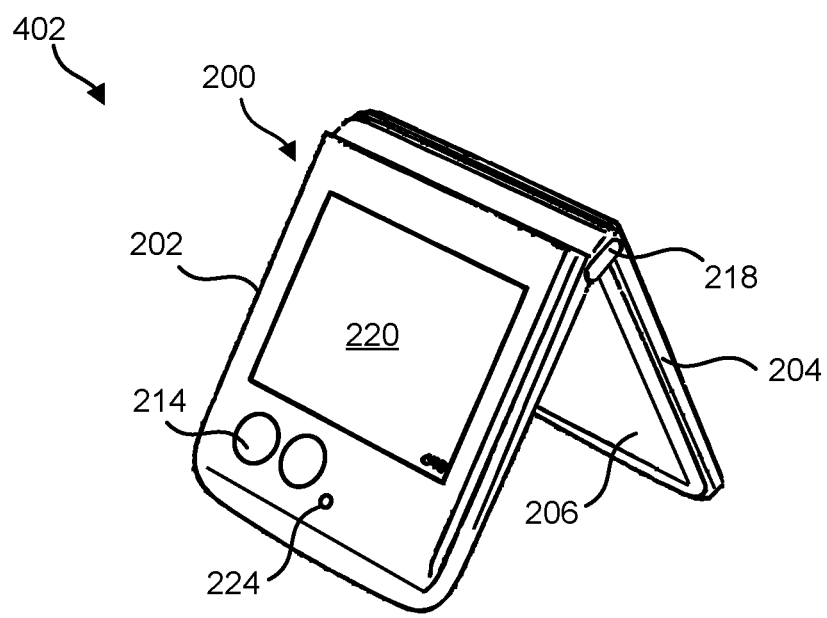
FIG. 4B is a perspective view of the electronic device of FIG. 4A in tent mode in accordance with certain embodiments.

Referring now to FIGS. 4A and 4B, some embodiments of the electronic device 102 may be geometrically deformable to allow the electronic device 102 to be self-supporting in an upright position. In some embodiments, for example, the electronic device 102 may be manipulated such that one or more camera sensors 214 and/or various other sensors 224 coupled to the electronic device 102 may be retained in a stable, upright position relative to a supporting surface. This feature may allow the user 108 to move away from the electronic device 102 while remaining within a field of view 106 of the electronic device 102.

To this end, some embodiments of the electronic device 102 include a hinge 218 or other fastening device that couples the first device housing 202 to the second device housing 204 while allowing an orientation of the first device housing 202 relative to the second device housing 204 to change. In some embodiments, the electronic device 102 may recognize a stand mode 400 or a tent mode 402, depending on the orientation of the first device housing 202 relative to the second device housing 204, as well as the orientation of the electronic device 102 with respect to a supporting surface.

FIG. 4A illustrates the electronic device 102 in stand mode 400. As shown, in certain embodiments, the hinge 218 and the back surface 208 of the second device housing 204 may be disposed adjacent to a supporting surface. In some embodiments, the first device housing 202 may be pivoted relative to the second device housing 204 such that an acute or right angle is formed between the first device housing 202 and the second device housing 204 such that the second display panel 220 is exposed. In other embodiments, the first device housing 202 may be pivoted at any angle between zero (0) and one hundred eighty (180) degrees relative to the second display panel 220. In certain embodiments, the first device housing 202 and the second device housing 204 may form an acute angle such that the second display panel 220 is tilted upwards toward the user 108. In these and other embodiments, the user's 108 view of the second display panel 220 may be optimized and user 108 interaction with the second display panel 220 may be facilitated. For example, the portion of the user interface 216 overlaid onto the second display panel 220 may be easily accessed by the user 108.

FIG. 4B illustrates the electronic device 102 in tent mode 402. As shown, in some embodiments, the first device housing 202 may be pivoted relative to the second device housing 204 such that an acute or right angle is formed between the first device housing 202 and the second device housing 204. In other embodiments, the first device housing 202 may be pivoted at any angle between zero (0) and one hundred eighty (180) degrees relative to the second display panel 220.

Unlike stand mode 400, however, in tent mode 402 the electronic device 102 may be turned upside down such that the hinge 218 is retained in a suspended position relative to the supporting surface. In these and other embodiments, the supporting surface may contact an edge of the first device housing 202 and/or the second device housing 204, and the second display panel 220 may be disposed in an upside-down position. In these and other embodiments, the image displayed on the second display panel 220 may be adjusted to appear to the user 108 to be right-side-up.

Figures 5A, 5B:
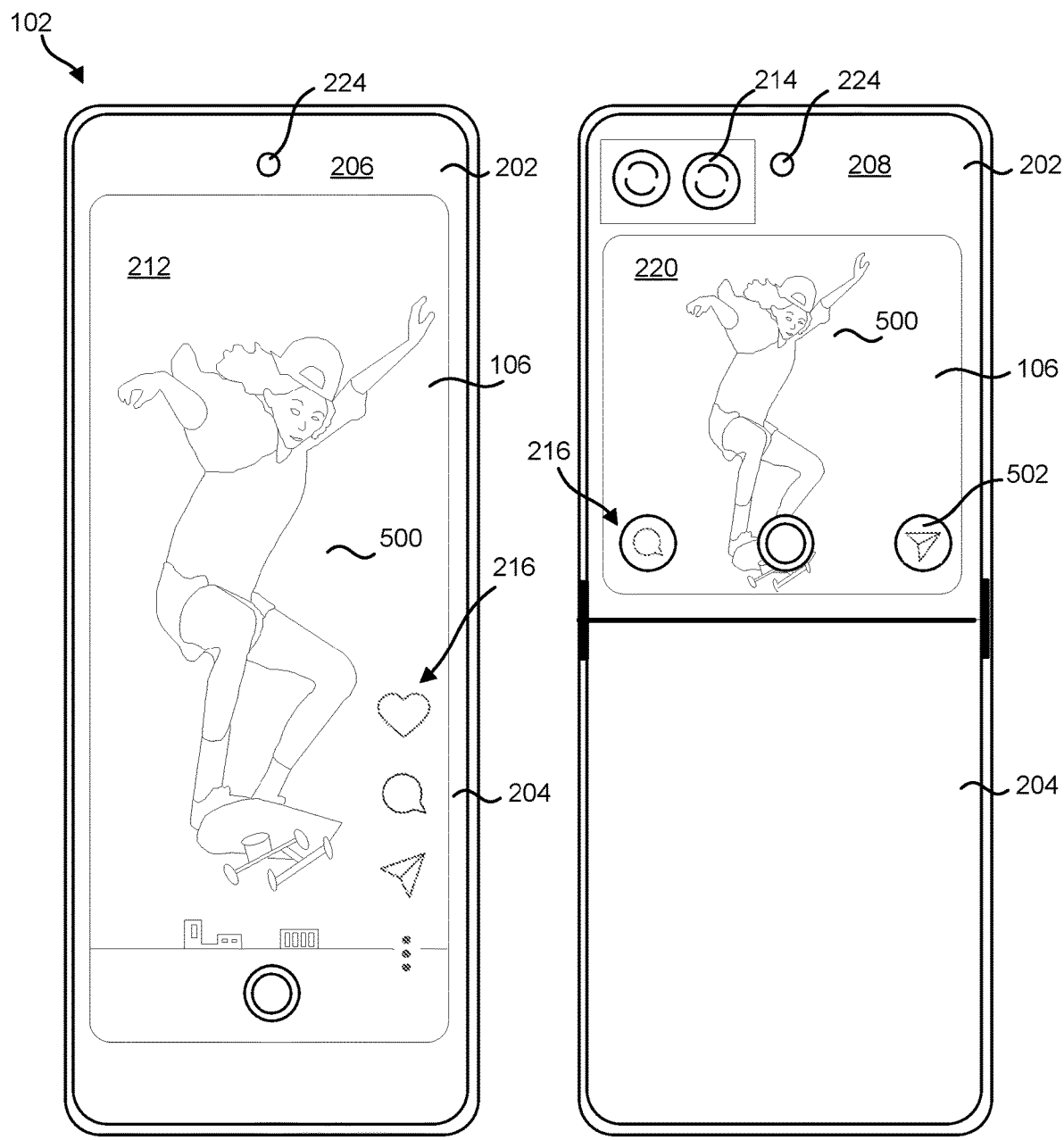
FIG. 5A is a front view of a representative embodiment of an electronic device in accordance with the disclosure.
FIG. 5B is a rear view of the electronic device of FIG. 5A.

Referring now to FIGS. 5A and 5B, in some embodiments, at least a portion of the user interface 216 may be overlaid onto the content creation application 500 displayed on the second display panel 220. In some embodiments, for example, one or more control buttons 502 such as a record control button, a playback control button, and/or a publish control button, may be overlaid onto the content creation application 500 on the second display panel 220. Each of the control buttons may be configured to receive user input in the form of touch input and/or gesture input, for example. In certain embodiments, the second display panel 220 may include a touchscreen configured to detect touch input and may further include various sensors 224 to detect gesture input. In some embodiments, the user input may be automatically transferred from the second display panel 220 to the first display panel 212.

In some embodiments, the processor 302 may be configured to detect a gesture of a user 108 within a field of view 106 of one or more camera sensors 214. In some embodiments, the processor 302 may activate the content creation application on the first display panel 212 in response to detecting the gesture. The gesture may include, for example, raising an arm, waving a hand, pointing a finger, a hand gesture, a facial expression, and/or body position such as bending a knee, sitting, or kneeling. In some embodiments, the configuration tools 312 may be configured to receive user input to assign various gestures to one or more actions or functions of the electronic device 102.

In some embodiments, the processor 302 may be configured to activate the content creation application 500 upon determining that the user 108 is facing the second display panel 220 or quick view display. In some embodiments, the electronic device 102 may incorporate utilize camera sensors 214 and/or facial recognition software or code to make the determination. In other embodiments, the processor 302 may determine that the user 108 is facing the second display panel 220 based on a direction and/or volume of audio input received from one or more microphones or other audio sensors 224. In some embodiments, the processor 302 may utilize location sensors, proximity sensors, heat sensors, ultrasonic sensors, and/or other sensors 224 to determine that the user 108 is facing the second display panel 220.

In these and other embodiments, the processor 302 may extract a field of view 106 from the camera sensor 214 and display the field of view 106 on the second display panel 220. In some embodiments, the processor 302 may extract the field of view 106 upon activating the content creation application 500. In certain embodiments, the field of view 106 may be automatically focused on the user 108 or another subject within the field of view 106 prior to or following extraction. In some embodiments, image processing may be performed on the extracted image to crop the image and/or to add text, color, graphics, or the like, to the image.

Figure 6:
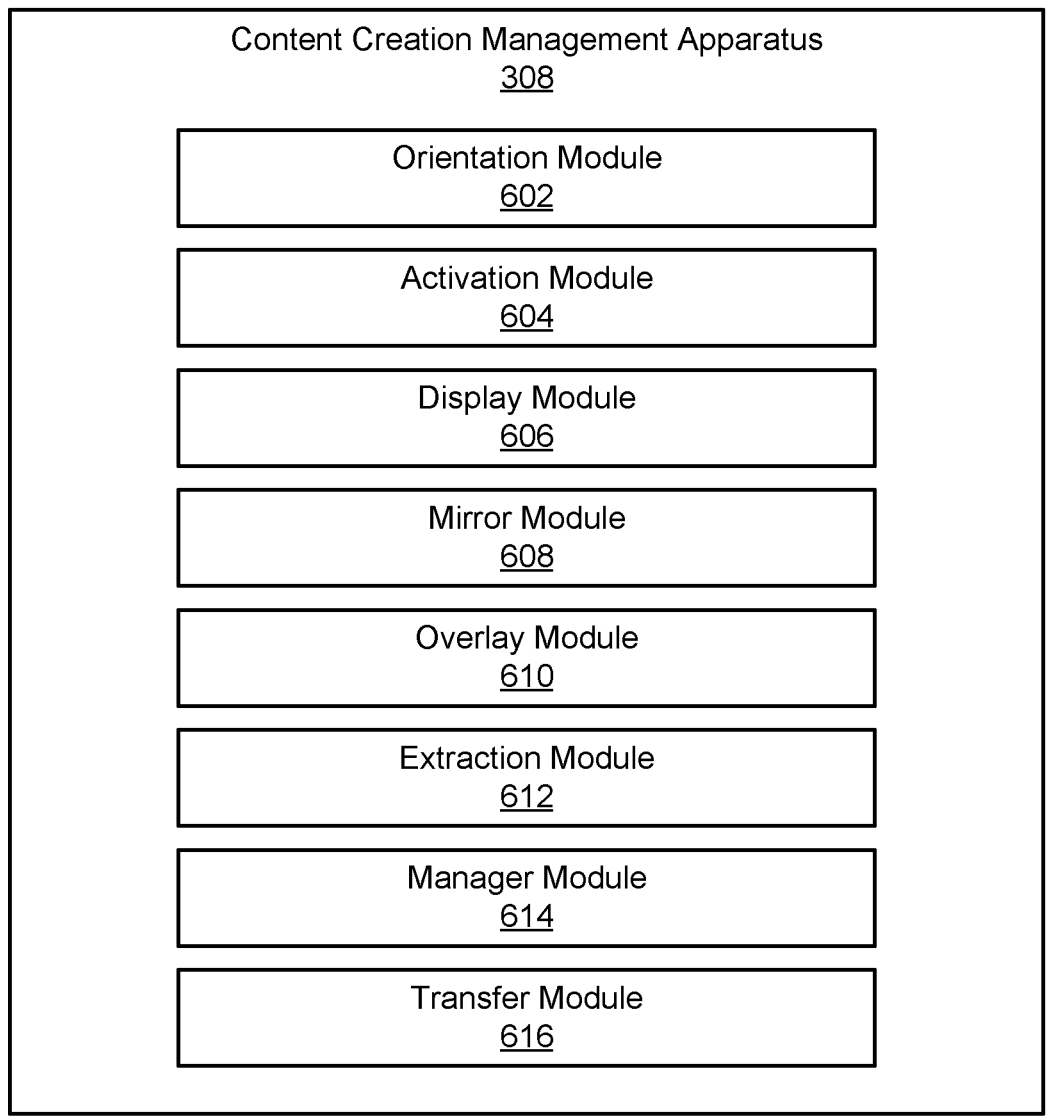
FIG. 6 is a schematic block diagram illustrating one embodiment of a content creation management apparatus in accordance with the disclosure.

Referring now to FIG. 6, some embodiments may include a content creation management apparatus 308 to manage content creation. In some embodiments, the content creation management apparatus 308 may include an orientation module 602, an activation module 604, a display module 606, a mirror module 608, an overlay module 610, an extraction module 612, a mirror module 608, and/or a transfer module 616. In some embodiments, the content creation management apparatus 308 may be stored on and/or implemented in connection with an electronic device 102. In some embodiments, the electronic device 102 includes a first device housing 202 that is pivotable relative to a second device housing 204 between a closed position and an axially displaced open position. A first display panel 212 is coupled to the first device housing 202. The first display panel 212 is exposed when the first device housing 202 and the second device housing 204 are in the axially displaced open position.

In some embodiments, a second display panel 220 is also coupled to the first device housing 202. The second display panel 220 is exposed both when the first device housing 202 and the second device housing 204 are in the closed position and when the first device housing 202 and the second device housing 204 are in the axially displaced open position.

In some embodiments, an orientation module 602 may be configured to detect an orientation of the first device housing 202 relative to the second device housing 204. For example, in certain embodiments, the orientation module 602 may determine whether the first device housing 202 is in a stand mode 400 or in a tent mode 402. In some embodiments, the orientation module 602 may adjust a position or orientation of an image displayed on the second display panel 220 accordingly.

In some embodiments, the activation module 604 may be configured to activate a content creation application 500 in response to user input. In some embodiments, the user input may be detected by one or more sensors 224 coupled to the electronic device 102. In some embodiments, the user input may be received by a user interface 216 disposed on the first display panel 212 and/or second display panel 220. The user input may include, for example, touch input and/or gesture input. In one embodiment, the activation module 604 may be configured to activate the content creation application 500 in response to determining that the user 108 is facing the second display panel 220.

In some embodiments, the display module 606 may be configured to display the content creation application 500 on the first display panel 212 in response to activation by the activation module 604. In some embodiments, the mirror module 608 may be configured to mirror at least a portion of the content creation application 500 on the second display panel 220. In this manner, in some embodiments, identical images may be displayed on the first display panel 212 and the second display panel 220. In other embodiments, one or more images 500 displayed on the first display panel 212 may be extracted and processed prior to being displayed on the second display panel 220. Thus, in certain embodiments, the image displayed on the second display panel 220 may be at least somewhat different from the image displayed on the first display panel 212.

In some embodiments, the first display panel 212 may include a user interface 216 configured to receive user input via an input device 310. In other embodiments, the user interface 216 may be configured to receive user input via one or more sensors 224. In these and other embodiments, the user interface 216 may be configured to receive touch input and/or gesture input.

In some embodiments, the overlay module 610 may be configured to overlay onto the second display panel 220 at least a portion of the user interface 216. The portion of the user interface 216 overlaid onto the second display panel 220 may be configured to receive user input via the input device 310 and/or one or more sensors 224.

In some embodiments, the portion of the user interface 216 overlaid onto the second display panel 220 may include one or more control buttons 502. In certain embodiments, the control button 502 may include, for example, a record control button configured to start and stop a video and/or audio recording and/or to capture text or an image. In some embodiments, the control button 502 may include a playback control button configured to fast forward, rewind, or playback recorded video, audio, or text content. In some embodiments, the control button 502 may include a publish control button configured to package recorded content and transmit, share, or publish the content via email, text, airdrop, social media, and/or the internet. Some embodiments of the overlay module 610 may be configured to detect user input, including touch input and/or gesture input, for example, to activate one or more of the control buttons 502.

Some embodiments of the content creation management apparatus 308 may include an extraction module 612 configured to extract a field of view 106 from at least one camera sensor 214 and to display the field of view 106 on the second display panel 220. In some embodiments, the extraction module 612 may process the extracted field of view 106 to focus, crop, position, augment, or otherwise process the field of view 106 prior to displaying the field of view 106 on the second display panel 220.

In some embodiments, the content creation management apparatus 308 may include a manager module 614 to receive and manage content produced by the content creation application 500. In some embodiments, the manager module 614 may be configured to store the content locally in memory 304 or on an external storage device in communication with the processor 302. In some embodiments, the manager module 614 may be configured to and/or distribute the content. In other embodiments, the manager module 614 may store the content on a remote server or cloud server 104, for example. In some embodiments, the manager module 614 may be configured to publish the content on social media and/or the internet.

In some embodiments, the transfer module 616 may be configured to transfer user input from the second display panel 220 to the first display panel 212. In some embodiments, the transfer module 616 may be configured to receive a keypress or other user input from the portion of the user interface 216 displayed on the second display panel 220 and transfer the user input to the user interface 216 on the first display panel 212.

Figure 7:
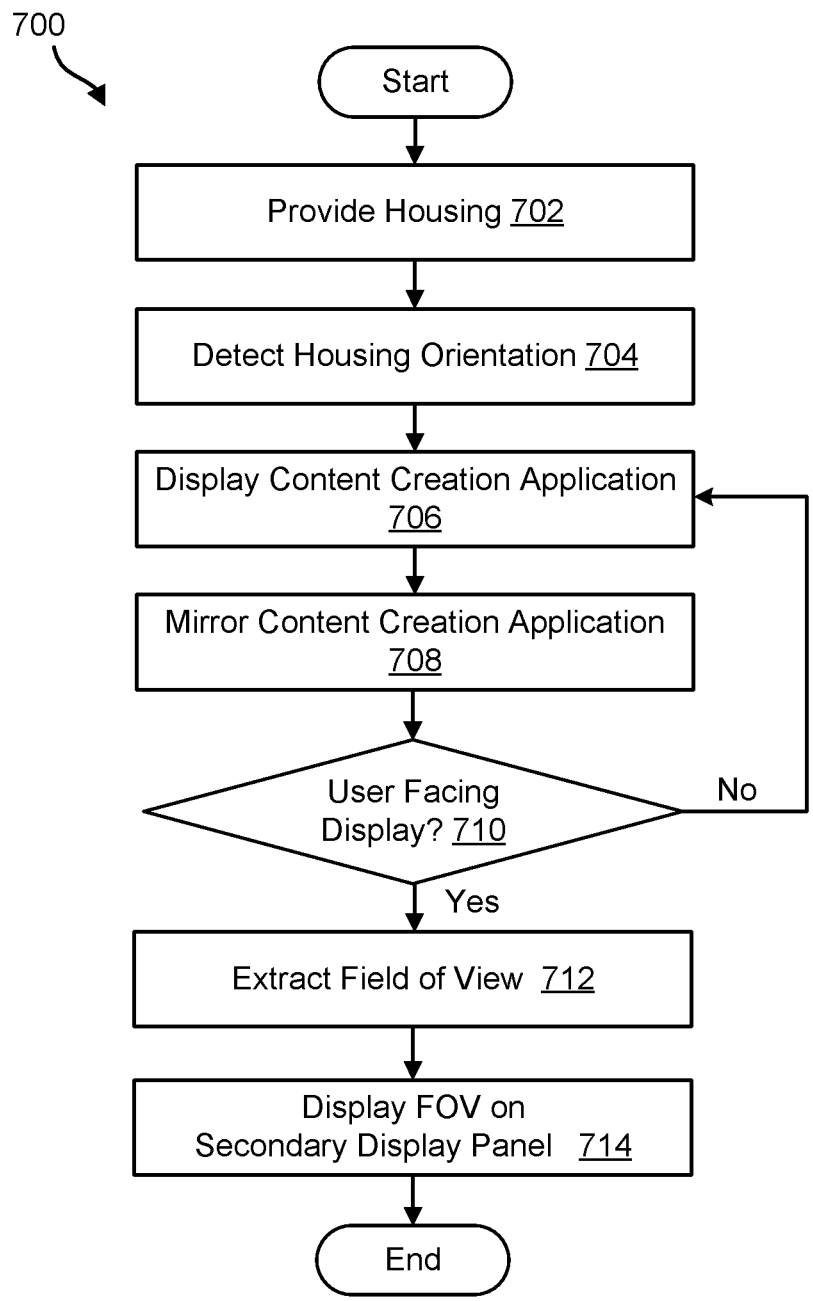
FIG. 7 is a schematic flow chart depicting a method for displaying a content creation application in accordance with some embodiments.

Referring now to FIG. 7, a method 700 to display a content creation application 500 in accordance with certain embodiments may include providing 702 a housing for an electronic device 102. The housing may be geometrically deformable and, in some embodiments, may include a first device housing 202 and a second device housing 204. The first device housing 202 may be pivotable relative to the second device housing 204 between a closed position and an axially displaced open position. A first display panel 212 and a second display panel 220 may be coupled to the first device housing 202. The first display panel 212 may be exposed when the first device housing 202 and the second device housing 204 are in the axially displaced open position. The second display panel 220 may be exposed both when the first device housing 202 and the second device housing 204 are in the closed position and when the first device housing 202 and the second device housing 204 are in the axially displaced open position.

In some embodiments, the method 700 to display a content creation application 500 may include detecting 704 an orientation of the first device housing 202 relative to the second device housing 204. In some embodiments, the orientation may include a stand mode 400 or a tent mode 402. In some embodiments, the method 700 may include displaying 706 the content creation application 500 on the first display panel 212 and mirroring 708 at least a portion of the content creation application 500 onto the second display panel 220.

In some embodiments, the method 700 may determine 710 whether the user 108 is facing the second display panel 220. If no, the method 700 may return to displaying 706 the content creation application 500. If yes, the method 700 may extract 712 a field of view 106 from one or more camera sensors 214 coupled to the electronic device 102. In some embodiments, extracting 712 the field of view 106 may include processing the field of view 106 to focus, crop, position, augment, or otherwise process the field of view 106. Finally, in some embodiments, the method 700 may include displaying 714 the field of view 106 on the second display panel 220.

Figure 8:
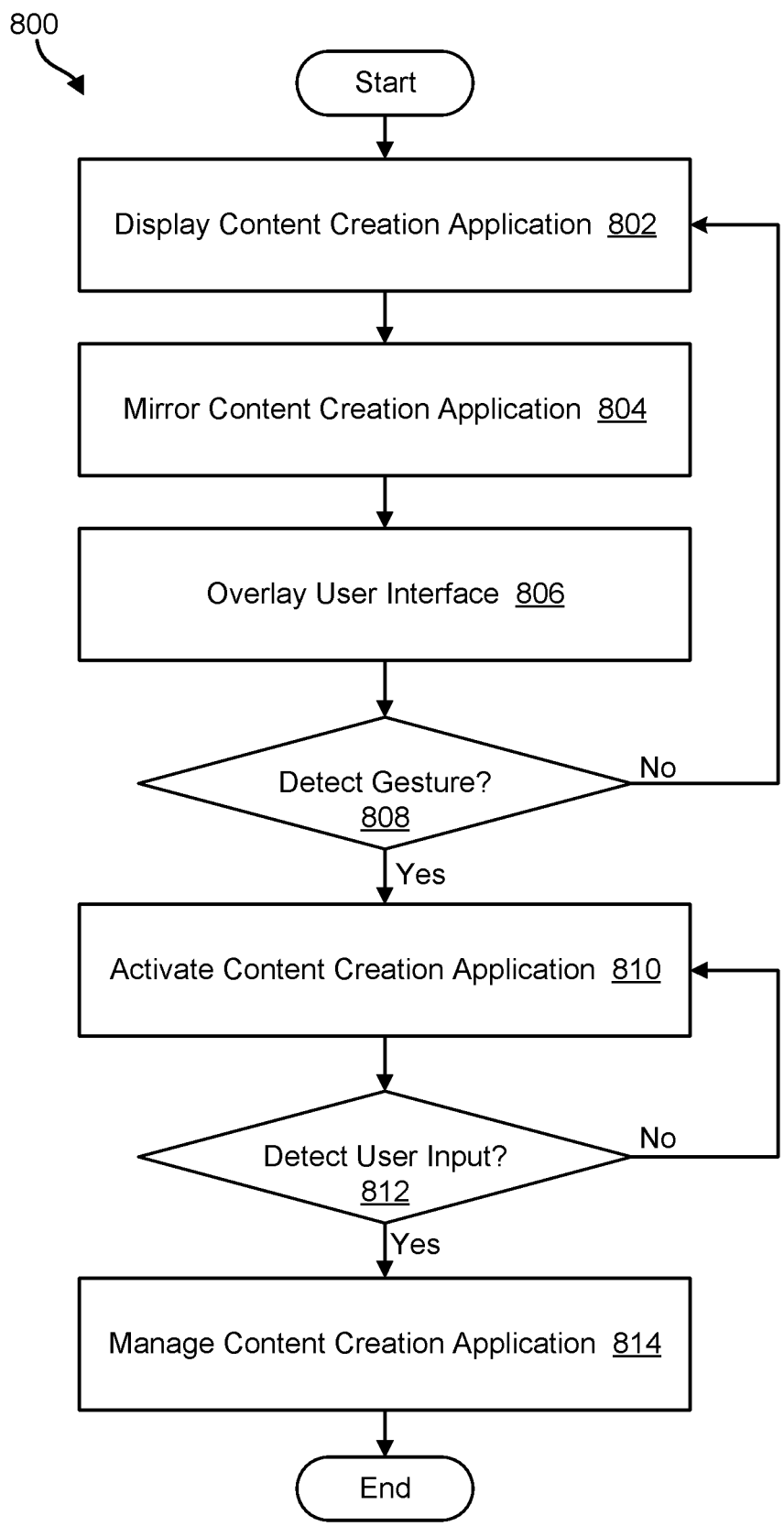
FIG. 8 is a schematic flow chart depicting a method for managing a content creation application in accordance with some embodiments.

Referring now to FIG. 8, a method 800 for managing a content creation application in accordance with certain embodiments may include displaying 802 a content creation application 500 on a first display panel 212 and mirroring 804 at least a portion of the content creation application 500 onto a second display panel 220. In some embodiments, the first display panel 212 may include a user interface 216. In some embodiments, the method 800 may include overlaying 806 at least a portion of the user interface 216 onto the second display panel 220. The portion of the user interface 216 on the second display panel 220 may be configured to receive user input to control and/or manage the content creation application 500.

In some embodiments, the method 800 may query whether a gesture of the user 108 is detected by one or more sensors 224 communicating with the second display panel 220. If no, the method 800 may return to displaying 802 the content creation application 500. If yes, embodiments of the method 800 may include activating 810 the content creation application 500. Activating the content creation application 500 may include enabling the user 108 to select various options for creating video, audio, and/or text creative content. Some embodiments of the method 800 may query whether user input is detected 812. If no, the method 800 may return to activating 810 the content creation application 500. If yes, the method 800 may include managing 814 the content creation application 500 to enable the user to create, store, and/or publish creative content.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An electronic device, comprising:
   a first device housing that is pivotable relative to a second device housing between a closed position and an axially displaced open position, wherein the first device housing comprises a front surface and a back surface, wherein the back surface comprises at least one camera sensor having a field of view directed outward from the back surface, wherein the first device housing is configured to be stabilized in a geometric orientation such that the at least one camera sensor is configured to face a user situated at a distance and receive gesture input from the user within the field of view;
   a first display panel coupled to the front surface of the first device housing, wherein the first display panel is exposed when the first device housing and the second device housing are in the axially displaced open position, wherein the first display panel is configured to communicate with the at least one camera sensor, the first display panel further comprising a user interface configured to receive user input;
   a second display panel coupled to the back surface of the first device housing adjacent to the at least one camera sensor, wherein the second display panel is exposed both when the first device housing and the second device housing are in the closed position and when the first device housing and the second device housing are in the axially displaced open position, the second display panel comprising at least one sensor configured to receive user input;
   a processor;
   a memory that stores code executable by the processor to:
      detect, via the at least one camera sensor at the back surface with the first device housing configured in the geometric orientation, the gesture input from the user situated at the distance;
      display, on the first second display panel, a content creation application in response to detecting the gesture input, wherein the content creation application comprises an image of the user performing the gesture input;
      control, via the gesture input, operation of the content creation application;
      overlay onto the content creation application on the second display panel at least a portion of the user interface configured to receive user input; and
      receive, via the at least one sensor of the second display panel, the user input to further control and manage the content creation application.

2. The electronic device of claim 1, wherein displaying the content creation application on the second display panel comprises the code is further executable by the processor to detect, via the at least one camera sensor, a gesture of a user within a field of view and to activate, on the first display panel, displaying, on the first display panel, the content creation application in response to the gesture input, and mirroring, on the second display panel, at least a portion of the content creation application.

3. The electronic device of claim 1, wherein the code is further executable by the processor to detect the geometric orientation of the first device housing relative to the second device housing.

4. The electronic device of claim 3, wherein the geometric orientation comprises one of a stand mode and a tent mode.

5. The electronic device of claim 1, wherein the user input comprises at least one of touch input and gesture input.

6. The electronic device of claim 5, wherein the code is further executable by the processor to transfer the user input from the second display panel to the first display panel.

7. The electronic device of claim 1, wherein detecting the gesture input of the user further comprises determining that the user is facing the second display panel.

8. The electronic device of claim 1, wherein the code is further executable by the processor to extract the field of view from the at least one camera sensor.

9. The electronic device of claim 8, wherein the code is further executable by the processor to display the field of view on the second display panel.

10. A method, comprising:
providing an electronic device comprising a first device housing that is pivotable relative to a second device housing between a closed position and an axially displaced open position, wherein the first device housing comprises a front surface comprising a first display panel and a back surface comprising a second display panel and at least one camera sensor, wherein the first display panel comprises a user interface configured to receive user input and the second display panel comprises at least one sensor configured to receive user input, wherein the at least one camera sensor comprises a field of view directed outward from the back surface, wherein the first device housing is configured to be stabilized in a geometric orientation such that the at least one camera sensor is configured to face a user at a distance and receive gesture input from the user within the field of view;
detecting, via the at least one camera sensor at the back surface with the first device housing configured in the geometric orientation, the gesture input from the user situated at the distance;
displaying, on the first second display panel, a content creation application in response to detecting the gesture input, wherein the content creation application comprises an image of the user performing the gesture input;
controlling, via the gesture input, operation of the content creation application;
overlaying onto the content creation application on the second display panel at least a portion of the user interface configured to receive user input; and
receiving, via the at least one camera sensor of the second display panel, the user input to further control and manage the content creation application.

11. The method of claim 10, wherein the first display panel is exposed when the first device housing and the second device housing are in the axially displaced open position, and wherein the second display panel is exposed both when the first device housing and the second device housing are in the closed position and when the first device housing and the second device housing are in the axially displaced open position.

12. The method of claim 10, further comprising detecting, via one or more sensors, the geometric orientation of the first device housing relative to the second device housing.

13. The method of claim 12, wherein the orientation comprises one of a stand mode and a tent mode.

14. The method of claim 10, wherein displaying the content creation application on the second display panel comprises displaying, on the first display panel, the content creation application in response to the gesture input, and mirroring, on the second display panel, at least a portion of the content creation application.

15. The method of claim 10, wherein receiving the user input comprises detecting at least one of touch input and gesture input.

16. The method of claim 15, wherein receiving the user input comprises transferring the user input from the second display panel to the first display panel.

17. A computer program product comprising a computer readable storage medium that stores code executable by a processor, the executable code comprising code to perform:
detecting, via at least one camera sensor of an electronic device, gesture input from a user situated at a distance, wherein the electronic device comprises a front surface comprising a first display panel and a back surface comprising a second display panel, wherein the back surface further comprises the at least one camera sensor;
displaying, on the second first display panel, a content creation application in response to the gesture input, wherein the first display panel comprises a user interface and content creation application comprises an image of the user performing the gesture input;
controlling, via the gesture input, operation of the content creation application;
overlaying onto the content creation application on the second display panel at least a portion of a user interface configured to receive user input; and
receiving, via the at least one sensor of the second display panel, the user input to further control and manage the content creation application.

18. The computer program product of claim 17, wherein the executable code is further configured to perform detecting a geometric orientation of the first display panel relative to the second display panel.

19. The computer program product of claim 17, wherein the executable code is further configured to perform determining, via the at least one camera sensor whether the user is facing the second display panel.

20. The computer program product of claim 17, wherein the executable code is further configured to perform transferring the user input from the second display panel to the first display panel.

* * * * *